2,954,398

PRODUCTION OF ALPHA-CHLORACRYLIC ACID ESTERS

Manfred Minsinger, Ludwigshafen (Rhine), and Herbert Friederich, Worms, Germany, assignors to Badische Anilin- & Soda-Fabrik Aktiengesellschaft, Ludwigshafen (Rhine), Germany No Drawing. Filed Feb. 28, 1957, Ser. No. 642,935

Claims priority, application Germany Mar. 1, 1956

12 Claims. (Cl. 260—486)

This invention relates to a process for the production of alpha-chloracrylic acid esters by the catalytic splitting off of hydrogen chloride from dichlorpropionic acid esters which contain at least one chlorine atom in alpha-position.

It is known to prepare monomeric alpha-chloracrylic acid esters by splitting off hydrogen chloride from the esters of dichlorpropionic acids, such as alpha.alpha-dichlorpropionic acid or alpha.beta-dichlorpropionic acid. To split off the hydrogen chloride the dichlorpropionic acids are as a rule treated in the liquid phase with compounds which split off hydrogen chloride in the presence of water. For this purpose there are used for example aqueous solutions or aqueous suspensions of alkali metal or alkaline earth metal hydroxides, carbonates or bicarbonates or of salts of the alkali or alkaline earth metals with organic acids, as the agents for splitting off hydrogen chloride. Other methods operate with tertiary organic bases or aqueous solutions of aminoacids as agents for splitting off hydrogen chloride. The hydrogen chloride is thereby split off by stoichiometrical amounts of basic-reacting substances.

According to older proposals, alpha-chloracrylic acid esters can also be prepared by a catalytic process in which the vapors of alpha.beta-dichlorpropionic acid esters are led at elevated temperatures in the gas phase over catalysts, which consist of metal salts which are applied to carrier substances such as carbon and the like.

We have now found that alpha-chloracrylic acid esters can be prepared in a simple way from dichlorpropionic acid esters which contain at least one chlorine atom in alpha-position, by treating these dichlorpropionic acid esters with catalytic amounts of organic compounds from the group consisting of acid amides, acid imides, acid nitriles and the amines, or with carboxylic or sulfonic acids.

Suitable acid amides are for instance the unsubstituted or the mono- or disubstituted amides of saturated aliphatic carboxylic acids containing from 1 to 4 carbon atoms, for example formamide, N-methylformamide, N.N-dimethylformamide, N-ethylformamide, N.N-diethylformamide, N.N-dimethylacetamide, N-butylformamide, N.N-dibutylformamide, N-methylacetamide and other acid amides. Cyclic acid amides (lactams) containing from 5 to 9 ringmembers which may be substituted on the N-atom are also effective catalysts, for example pyrrolidone-2, N-methylpyrrolidone-2, ε-caprolactam, ω-caprylic lactam and the like. Suitable acid imides derive from aliphatic or aromatic dicarboxylic acids, such as succinimide or phthalimide.

Other substances effective as catalysts are for example the nitriles of saturated aliphatic mono- or dicarboxylic acids containing not more than 8 carbon atoms, and the mono- or dinitriles of aromatic mono- or dicarboxylic acids, for example acetonitrile, succinic acid dinitrile, adipodinitrile, phthalodinitrile and the like.

Amines catalysts which can be used are for instance aliphatic or aromatic, primary, secondary or tertiary mono- or diamines, such as N-methylaniline, N.N-dimethylaniline, quinoline, isoquinoline, ortho-chloraniline, meta-chloraniline, para-chloraniline, N-butylpyrrolidine, N-alkylpiperidines, alkylpyridines, N.N-dibutylaminoethanol, N.N-diethylaminopropanol, N.N-dimethylaminopropanol and phenothiazine.

The amines used in catalytic amounts may contain, besides the amino group, other functional groups, such as OH-groups, halogen, carbonyl or carboxyl groups, or also sulfur in combined form.

Those amines of which the boiling point is similar to or higher than that of the alpha-chloracrylic acid ester formed have proved especially suitable catalysts for the splitting off of hydrogen chloride. It is preferable to work while excluding water.

Carboxylic or sulfonic acids may also be used as catalysts, preferably the saturated aliphatic mono-, di- or polycarboxylic acids with a chain length of from 2 to 8 carbon atoms, for example propionic acid, normal butyric acid, isobutyric acid, pentane acids, hexane acids, heptane acids and $C_8$-fatty acids, for example 2-ethylhexane-acid-1 or dicarboxylic acids, such as succinic acid, glutaric acid or adipic acid. Halogenated aliphatic carboxylic acids are also especially suitable, as for example monochloracetic acid, dichloracetic acid, trichloracetic acid, alpha-chlorpropionic acid, beta-chlorpropionic acid, alpha.beta-dichlorpropionic acid, alpha.alpha-dichlorpropionic acid, alpha.alpha.beta-trichlorpropionic acid, alpha-chlor-normal-butyric acid, beta-chlorisobutyric acid and the like.

Aromatic carboxylic acids, such as benzoic acid, salicyclic acid and ortho-chlorbenzoic acid, are also effective. Among the sulfonic acids, the aromatic sulfonic acids are especially suitable, such as para-toluenesulfonic acid, ortho-toluenesulfonic acid and para-nitrotoluene-ortho-sulfonic acid.

These catalytically active substances are preferably used in amounts of 0.1 to 10% with reference to the weight of dichlorpropionic acid ester. They can be used in pure form or in admixture with each other, or also in the form of their hydrohalides in so far as they are capable of forming the same.

The splitting off of hydrogen chloride may be effected either in the liquid or gas phase.

When working in the gas phase, the catalyst used is supplied in vapor form to the reaction vessel, preferably together with the dichlorpropionic acid ester.

The reaction may be carried out for example by mutually vaporizing the dichlorpropionic acid ester and the catalyst and leading them in the gas phase, preferably after dilution with indifferent gases, such as nitrogen or carbon monoxide, through the reaction vessel. The reaction vessel can be filled with filler bodies, for example of glass.

In general it is preferable to work at temperatures between 200° and 550° C., preferably between about 220° and 350° C. The most favorable working temperature is different for the individual catalysts and initial esters and can readily be ascertained by preliminary experiment.

The process can be carried out at normal, reduced or also moderately increased pressure discontinuously or continuously. The alpha-chloracrylic acid esters are obtained in good yields without any appreciable polymerization taking place; the unconverted alpha.beta-dichlorpropionic acid ester is again led through the reaction vessel after the addition of catalyst.

When working in the liquid phase, the temperature may be lowered considerably as compared with working in the gas phase; the splitting off of hydrogen chloride in this case is preferably carried out between 80° C. and the boiling point of the alpha-dichlorpropionic acid ester in question. The preferred reaction temperatures lie between 130° and 160° C. The process is preferably carried out in a reaction vessel which is resistant to corrosion, for example made of stainless steel or graphite, which is heated to the desired reaction temperature, at normal pressure or at reduced or increased pressure. It may be operated continuously in a simple manner. In order to avoid spontaneous polymerization of the chloracrylic acid ester formed, it is preferable to add a polymerization inhibitor, such as phenothiazine or hydroquinone.

The reaction products can be separated by distillation. After distilling off the alpha-chloracrylic acid ester, the remaining mixture of dichlorpropionic acid ester and catalyst can again be subjected to the reaction, if desired after the addition of fresh dichlorpropionic acid ester. The unconverted dichlorpropionic acid ester may however also be recovered by distillation and then reacted.

By prolonging the residence time and also by varying the reaction temperature, the reaction can however also be directed to give a quantitative conversion of the dichlorpropionic acid ester introduced.

By adding halides of metals of the 2nd to 8th groups of the periodic system, the most favorable temperature in the process can be lowered by about 10° to 15° C. For this purpose there may be used for example complex compounds of the metal halides with the catalysts, if desired with an excess of the catalyst concerned; mixtures of different complex compounds may also be used. Suitable metal halides are for example the halides of zinc, cadmium, aluminium, chromium or cobalt. It is not necessary to use isolated complex compounds of such metal halides, but on the contrary it is sufficient to add the metal halide to the mixture of dichlorpropionic acid ester and catalyst, if desired while heating. It is recommended to use between 0.1 and 5% of metal halide with reference to the dichlorpropionic acid ester introduced.

According to the present invention it is possible to prepare for example the methyl, ethyl, propyl, n-butyl and isobutyl esters of alpha-chloracrylic acid.

The following examples will further illustrate this invention but the invention is not restricted to these examples. The parts specified in the examples are parts by weight.

Example 1

A mixture of 157 parts of alpha.beta-dichlorpropionic acid methyl ester, 15 parts of N-methyl-pyrrolidone-2 and 1 part of phenothiazine is heated for 6 hours at 160° C. in a vessel provided with a reflux condenser. By fractional distillation there are obtained from the reaction mixture 105 parts of alpha-chloracrylic acid methyl ester, 20 parts of alpha.beta-dichlorpropionic acid methyl ester and 26 parts of residue consisting mainly of the catalyst or its hydrochloride. With a conversion of 87%, the yield of aplha-chloracrylic acid methyl ester is 99% with reference to the alpha.beta-dichlorpropionic acid methyl ester converted.

In the following table, the columns have the following significance:

A = number of the example
B = the amount, in parts, of alpha.beta-dichlorpropionic acid methyl ester used
C = the amount, in parts, of catalyst and the particular catalyst used
D = the temperature in ° C.
E = the time in hours
F = the amount, in parts, of alpha-chloracrylic acid methyl ester obtained
G = the amount, in parts, of unconverted alpha.beta-dichlorpropionic acid methyl ester
H = the amount, in parts, of residue+catalyst
I = the conversion in percent, and
J = the yield in percent.

| A | B | C | D | E | F | G | H | I | J |
|---|---|---|---|---|---|---|---|---|---|
| 2 | 157 | 15 N,N-dimethylformamide | 160 | 6 | 90 | 25 | 30 | 84 | 88 |
| 3 | 157 | 7.5 N-methylpyrrolidone-2 | 140 | 6 | 80 | 42 | 22 | 73.3 | 90 |
| 4 | 157 | 20 N-methylpyrrolidone-2-hydrochloride | 140 | 6 | 85 | 40 | 23 | 74.5 | 93.8 |
| 5 | 157 | 15 N-butyl-formamide | 160 | 6 | 75 | 30 | 38 | 81 | 76.3 |
| 6 | 157 | 15 N,N-dimethylacetamide | 150 | 6 | 88 | 40 | 18 | 74.5 | 98 |
| 7 | 157 | 15 pyrrolidone-2 | 150 | 6 | 80 | 37 | 23 | 76.5 | 86 |
| 8 | 157 | 15 N-methylpyrrolidone and 2 CdCl₂ | 130 | 6 | 95 | 27 | 32 | 83 | 94 |
| 9 | 157 | 10 benzonitrile | 150 | 6 | 45 | 95 | 15 | 39.5 | 94.5 |
| 10 | 157 | 10 succinodinitrile | 150 | 6 | 44 | 90 | 16 | 42.7 | 68 |
| 11 | 157 | 10 adiponitrile | 150 | 6 | 35 | 110 | 13 | 30 | 97 |
| 12 | 157 | 10 succinimide | 150 | 6 | 45 | 90 | 21 | 42.5 | 87.5 |
| 13 | 157 | 3 phthalimide | 150 | 6 | 48 | 88 | 15 | 44 | 89 |

Example 14

A mixture of 157 parts of alpha.beta-dichlorpropionic acid methyl ester and 12 parts of phenothiazine is heated for 6 hours at 150° C. in a vessel provided with a reflux condenser. By fractional distillation there are obtained from the reaction mixture 74 parts of alpha-chloracrylic acid methyl ester, 59 parts of alpha.beta-dichlorpropionic acid methyl ester and 19 parts of residue which consists mainly of the catalyst or its hydrochloride and the stabilizer. With a conversion of 67%, the yield of alpha-chloracrylic acid methyl ester is 98.5% with reference to the alpha.beta-dichlorpropionic acid methyl ester converted.

Examples 15–21

| Example | 15 | 16 | 17 | 18 | 19 | 20 | 21 |
|---|---|---|---|---|---|---|---|
| parts of alpha.beta-dichlorpropionic acid methyl ester | 157 | 157 | 157 | 157 | 157 | 157 | 157 |
| parts of catalyst+1 part of phenothiazine as stabilizer | A | B | C | D | E | F | G |
| temperature, ° C. | 150 | 150 | 145 | 150 | 145 | 140 | 140 |
| time in hours | 6 | 6 | 6 | 6 | 4 | 4 | 4 |
| parts of alpha-chloracrylic acid methyl ester | 45 | 72 | 80 | 65 | 58 | 65 | 85 |
| parts of unconverted alpha.beta-dichlorpropionic acid methyl ester | 90 | 48 | 44 | 62 | 72 | 63 | 35 |
| residue+catalyst+stabilizer | 21 | 17 | 16 | 18 | 18 | 16 | 15 |
| conversion, percent | 43 | 69.5 | 72 | 60.5 | 54 | 60 | 78 |
| yield, percent | 87.5 | 86.5 | 92 | 89 | 89 | 90 | 91 |

A = 8 parts of N-methyl aniline.
B = 8 parts of N,N-dimethylaniline.
C = 8 parts of quinoline.
D = 8 parts of N,N-diethylaminoethanol.
E = 8 parts of N,N-dimethylaminopropanol.
F = 8 parts of meta-chloraniline.
G = 8 parts of normal butylpyrrolidine.

Example 22

Into the top of a vertically-arranged tube of ceramic material 120 centimetres long and 40 millimetres in diameter there are led per hour the vapors of 100 grams of alpha.beta-dichloropropionic acid methyl ester to which 2% by weight of N-methylpyrrolidone-2 have been added. The reaction tube is filled with 6 millimetre glass Raschig rings and is heated externally to 320° C. After a mixture of 2,000 grams of alpha.beta-dichlorpropionic acid methyl ester with 40 grams of N-methylpyrrolidone-2 as catalyst has been led through, 1,938 grams of a reaction mixture are obtained which is fractionally distilled.

There are obtained 328 grams of alpha-chloracrylic acid methyl ester and also 1,552 grams of alpha.beta-dichlorpropionic acid methyl ester. The distillation residue amounts to 52 grams and consists mainly of the hydrochloride of the catalyst. The yield of alpha-chloracrylic acid methyl ester amounts to 96% of the theoretical yield with reference to the alpha.beta-dichlorpropionic acid methyl ester converted.

Example 23

The procedure of Example 22 is followed with the following differences.

2,000 parts of alpha.beta-dichlorpropionic acid methyl ester are used at the rate of 100 parts per hour with 50 parts of N.N-dibutylformamide, the temperature being 300° C. There are obtained 348 parts of alpha-chloracrylic acid methyl ester, 1,521 parts of alpha.beta-dichlorpropionic acid methyl ester and 64 parts of residue. Yield 95% of the theoretical.

Example 24

Following the procedure of Example 22 with 2,000 parts of alpha.beta-dichlorpropionic acid methyl ester at the rate of 100 parts per hour with 50 parts of adipodinitrile at 340° C., there are obtained 315 parts of alpha-chloracrylic acid methyl ester, 1,560 parts of alpha.beta-dichlorpropionic acid methyl ester and 70 parts of residue. Yield 93% of the theoretical.

Example 25

Following the procedure of Example 22 with 2,000 parts of alpha.beta-dichlorpropionic acid methyl ester at the rate of 100 parts per hour with 50 parts of benzonitrile at 340° C., there are obtained 384 parts of alpha-acrylic acid methyl ester, 1,370 parts of alpha.beta-dichlorpropionic acid methyl ester and 81 parts of residue. Yield 90% of the theoretical.

Example 26

Following the procedure of Example 22 with 2,000 parts of alpha.beta-dichlorpropionic acid methyl ester at the rate of 100 parts per hour with 60 parts of pyridine at 330° C., there are obtained 475 parts of alpha-chloracrylic acid methyl ester, 1,338 parts of alpha.beta-dichlorpropionic acid methyl ester and 81 parts of residue. Yield 93% of the theoretical.

Example 27

Following the procedure of Example 22 with 2,000 parts of alpha.beta-dichlorpropionic acid methyl ester at the rate of 100 parts per hour with 40 parts of quinoline at 300° C., there are obtained 705 parts of alpha-chloracrylic acid methyl ester and 1,003 parts of alpha.beta-dichlorpropionic acid methyl ester and 88 parts of residue. Yield 92% of the theoretical.

By leading alpha.beta-dichlorpropionic acid methyl ester without any catalyst through the reaction tube under otherwise the same conditions as in Examples 22 to 27, no alpha-chloracrylic acid methyl ester is obtained and the initial material is practically unchanged.

Example 28

A mixture of 157 parts of alpha.beta-dichlorpropionic acid methyl ester, 8 parts of 2-ethylhexane acid-1 and 0.5 part of picric acid is heated for 6 hours at 145° C. in a vessel provided with a reflux condenser. By fractional distillation there are obtained from the reaction mixture 52 parts of alpha-chloracrylic acid methyl ester, 86 parts of alpha.beta-dichlorpropionic acid methyl ester and 13 parts of products of higher boiling point (residue) consisting mainly of the catalyst and the stabilizer used. With a conversion of 45%, the yield of alpha-chloracrylic acid methyl ester is 95.5% with reference to the alpha.beta-dichlorpropionic acid methyl ester converted.

Examples 29–44

These examples are carried out in a similar way to Example 28 and the following table shows the initial materials, the catalysts, stabilizers, temperatures, time of reaction, the products, the percentage of the conversion and of the yields.

| Example | parts of alpha.beta-dichlorpropionic acid methyl ester | parts of catalyst+0.5 part of picric acid as stabilizer | Temperature | Time in hours | parts of alpha-chloracrylic acid methyl ester | parts of unconverted alpha.beta-dichlor-propionic acid methyl ester | residue+catalyst+stabilizer | conversion, percent | yield, percent |
|---|---|---|---|---|---|---|---|---|---|
| 29 | 157 | 8 monochloracetic acid | 140 | 6 | 54 | 81 | 14 | 48 | 93 |
| 30 | 157 | 8 dichloracetic acid | 140 | 6 | 54 | 83 | 13 | 47 | 96 |
| 31 | 157 | 8 trichloracetic acid | 140 | 6 | 60 | 75 | 12 | 51 | 96 |
| 32 | 157 | 8 alpha,alpha-dichlor-propionic acid | 150 | 6 | 95 | 41 | 17 | 74 | 96 |
| 33 | 157 | 8 alpha,beta-dichlor-propionic acid | 150 | 6 | 65 | 70 | 17 | 58 | 97 |
| 34 | 157 | 8 alpha-chlorpropionic acid | 145 | 6 | 61 | 75 | 10 | 52 | 97 |
| 35 | 157 | 8 beta-chlorpropionic acid | 145 | 6 | 55 | 80 | 15 | 49 | 93 |
| 36 | 157 | 8 alpha-chlor-n-butyric acid | 145 | 6 | 76 | 50 | 16 | 68 | 92 |
| 37 | 157 | 8 beta-chlor-isobutyric acid | 145 | 6 | 55 | 75 | 18 | 52 | 87.5 |
| 38 | 157 | 8 para-toluene-sulphonic acid | 150 | 6 | 74 | 44 | 22 | 72 | 86 |
| 39 | 157 | 8 para-nitrotoluene-ortho-sulfonic acid | 150 | 6 | 48 | 85 | 16 | 46 | 87 |
| 40 | 157 | 6 benzoic acid | 145 | 6 | 50 | 85 | 14 | 46 | 90.5 |
| 41 | 157 | 6 salicylic acid | 145 | 6 | 57 | 75 | 12 | 52 | 90.5 |
| 42 | 157 | 6 ortho-chlorbenzoic acid | 145 | 6 | 42 | 95 | 11 | 40 | 88 |
| 43 | 158 | 5 succinic acid | 150 | 6 | 43 | 95 | 11 | 40 | 90 |
| 44 | 157 | 5 adipic acid | 150 | 6 | 64 | 71 | 10 | 55 | 97 |

Analogous results are obtained in any of Examples 28 to 44 when 0.5 part of hydroquinone or phenothiazine is used as stabilizer instead of picric acid.

We claim:

1. A process for the production of alpha-chloroacrylic acid esters of lower alkyl alcohols by catalytic splitting off of hydrogen chloride at elevated temperature from alpha,beta-dichloropropionic acid esters of lower alkanols which comprises carrying out the process in the presence of 0.1 to 10 percent, with reference to the weight of the alpha,beta-dichloropropionic acid ester, of a catalyst selected from the group consisting of saturated carboxylic acid amides containing from 1 to 4 carbon atoms, cyclic acid amides containing from 5 to 9 ring members, carboxylic acid imides of aliphatic dicarboxylic acids, carboxylic acid imides of aromatic dicarboxylic acids, carboxylic acid nitriles of saturated aliphatic carboxylic acids containing not more than 8 carbon atoms, mono- and dinitriles of aromatic mono- and dicarboxylic acids, primary, secondary and tertiary aliphatic and aromatic mono- and diamines and saturated mono-, di- and polycarboxylic acids with a chain length from 2 to 8 carbon atoms.

2. A process as claimed in claim 1 wherein the catalytic splitting off of hydrogen chloride is carried out in the liquid phase at temperatures between 80° C. and the boiling point of the alpha,beta-dichloropropionic acid ester.

3. A process as claimed in claim 1 wherein the catalytic splitting off of hydrogen chloride is carried out in the gas phase at temperatures between 200° and 550° C.

4. A process as claimed in claim 3 wherein the catalytic splitting off of hydrogen chloride is carried out in the gas phase at temperatures between 220° and 350° C.

5. A process as claimed in claim 1 wherein in addition to the said catalyst there is also added 0.1 to 5 percent of a halide of a member of the group consisting of zinc, cadmium, aluminum, chromium and cobalt.

6. A process as claimed in claim 1 wherein the process is carried out under anhydrous conditions.

7. A process for the production of an ester of alpha-chloracrylic acid which comprises catalytically splitting off hydrogen chloride from a lower alkyl ester of alpha,beta-dichloropropionic acid in the presence, as catalyst, of 0.1 to 10% with reference to the weight of the alpha,beta-dichloropropionic acid ester of an amine of which the boiling point is higher than that of the alpha-chloracrylic acid ester formed.

8. A process as claimed in claim 7, wherein the catalyst used is quinoline.

9. A process as claimed in claim 7, wherein the catalyst used is isoquinoline.

10. A process as claimed in claim 1, wherein the catalyst used in adipodinitrile.

11. A process for the production of an ester of alpha-chloracrylic acid which comprises catalytically splitting off hydrogen chloride from a lower alkyl ester of alpha, beta-dichloropropionic acid in the presence as a catalyst of 0.1% to 10% by weight based on the weight of the alpha,beta-dichloropropionic acid ester of N-methyl-pyrrolidone.

12. A process for the production of an ester of alpha-chloracrylic acid which comprises catalytically splitting off hydrogen chloride from a lower alkyl ester of alpha, beta-dichloropropionic acid in the presence as a catalyst of 0.1% to 10% by weight based on the weight of the alpha-beta-dichloropropionic acid ester of N-butyl pyrrolidine.

References Cited in the file of this patent

UNITED STATES PATENTS

| | | |
|---|---|---|
| 1,934,613 | Jacobi et al. | Nov. 7, 1933 |
| 2,087,466 | Bauer et al. | July 20, 1937 |
| 2,245,547 | Pollack | June 10, 1941 |
| 2,376,067 | Long | May 15, 1945 |
| 2,386,694 | Lichty | Oct. 9, 1945 |
| 2,388,657 | Long | Nov. 6, 1945 |
| 2,683,704 | Anspon | July 13, 1954 |
| 2,694,726 | Anspon | Nov. 16, 1954 |
| 2,754,322 | Anspon | July 10, 1956 |
| 2,862,960 | Pollack | Dec. 2, 1958 |

UNITED STATES PATENT OFFICE
CERTIFICATION OF CORRECTION

Patent No. 2,954,398                               September 27, 1960

Manfred Minsinger et al.

It is hereby certified that error appears in the above numbered patent requiring correction and that the said Letters Patent should read as corrected below.

Column 3, line 50, for "tou se" read -- to use --; column 7, line 31, for "anime" read -- amine --.

Signed and sealed this 23rd day of May 1961.

(SEAL)
Attest:

ERNEST W. SWIDER
Attesting Officer

DAVID L. LADD
Commissioner of Patents